United States Patent
Hu et al.

(10) Patent No.: US 12,489,155 B1
(45) Date of Patent: Dec. 2, 2025

(54) WARM-UP AND TEMPERATURE PRESERVATION APPARATUS FOR ENERGY STORAGE BATTERIES IN COLD REGIONS

(71) Applicant: Shandong University of Science and Technology, Qingdao (CN)

(72) Inventors: Xiangming Hu, Qingdao (CN); Hengyu Xu, Qingdao (CN); Boxuan Shang, Qingdao (CN); Shuaishuai Yin, Qingdao (CN); Zhiyuan Yang, Qingdao (CN); Mingming Li, Qingdao (CN); Qingsong Wang, Qingdao (CN); Xiaoping Li, Qingdao (CN); Guoyu Han, Qingdao (CN); Yurui Deng, Qingdao (CN); Yaru Li, Qingdao (CN); Hao Dong, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 0 days.

(21) Appl. No.: 19/223,220

(22) Filed: May 30, 2025

(30) Foreign Application Priority Data

May 30, 2024 (CN) .......................... 202410689232.6

(51) Int. Cl.
*H01M 10/615* (2014.01)
*H01M 10/613* (2014.01)
(Continued)

(52) U.S. Cl.
CPC ....... *H01M 10/615* (2015.04); *H01M 10/613* (2015.04); *H01M 10/627* (2015.04);
(Continued)

(58) Field of Classification Search
CPC ............. H01M 10/615; H01M 10/613; H01M 10/627; H01M 10/6568; H01M 10/658; H01M 50/682
See application file for complete search history.

(56) References Cited

U.S. PATENT DOCUMENTS

2013/0288096 A1* 10/2013 Frutschy ............ H01M 50/253
429/99

FOREIGN PATENT DOCUMENTS

| CN | 105070974 A | * 11/2015 |
| CN | 207060882 U | 3/2018 |

(Continued)

OTHER PUBLICATIONS

Luo Yutao, Lang Chunyan, Luo Buersi, "Investigation into Heating System of Lithium-Ion Battery Pack in Low-Temperature Environment", Journal of South China University of Technology (Natural Science Edition), No. 09, Sep. 15, 2016, Full Text.

*Primary Examiner* — Muhammad S Siddiquee

(57) ABSTRACT

This thermal management apparatus for energy storage batteries in cold regions combines a battery enclosure and a diesel-fired circulation heater. The enclosure comprises an enclosure body with dual-layer outer/inner housings separated by a first vacuum insulation layer, and a cover mounted atop the enclosure body containing a second vacuum layer. The inner housing incorporates a water reservoir interlayer connected to two upper-mounted delivery pipes. The cover features water delivery ports fitted with adapters coupling to the pipes, along with a cable routing hole accessing the inner housing. The heater forms a closed hydraulic loop by connecting its inlet and outlet to respective adapters. A temperature sensor installed on the inner housing's interior wall is linked to the heater for operational control. The dual vacuum insulation layers synergize with the circulating water system to maintain optimal battery temperature while minimizing heat dissipation.

10 Claims, 10 Drawing Sheets

(51) Int. Cl.
  *H01M 10/627* (2014.01)
  *H01M 10/6568* (2014.01)
  *H01M 10/658* (2014.01)
  *H01M 50/682* (2021.01)

(52) U.S. Cl.
  CPC ..... *H01M 10/6568* (2015.04); *H01M 10/658* (2015.04); *H01M 50/682* (2021.01); *H01M 2220/10* (2013.01)

(56) References Cited

FOREIGN PATENT DOCUMENTS

| | | | | | |
|---|---|---|---|---|---|
| CN | 108023045 | A | * | 5/2018 | .......... H01M 10/653 |
| CN | 209544565 | U | | 10/2019 | |
| CN | 115642356 | A | * | 1/2023 | |
| CN | 117030091 | A | | 11/2023 | |
| CN | 117458366 | A | | 1/2024 | |
| KR | 101981688 | B1 | * | 5/2019 | .............. B65D 1/24 |

* cited by examiner

WARM-UP AND TEMPERATURE PRESERVATION APPARATUS FOR ENERGY STORAGE BATTERIES IN COLD REGIONS

CROSS-REFERENCE TO RELATED APPLICATIONS

The present application claims the priority of Chinese patent application entitled "Warm-up and Temperature Preservation Apparatus for Energy Storage Batteries in Cold Regions" submitted on May 30, 2024, with the application number of 202410689232.6, the entire contents of which are incorporated herein by reference.

TECHNICAL FIELD

The present application relates to thermal management of energy storage batteries, and more particularly relates to a warm-up and temperature preservation apparatus for energy storage batteries in cold regions.

BACKGROUND

With continuous exploitation of coal resources for example in China, spontaneous combustion of opencast coal mines has become one of the major disasters leading to destruction of coal resources as well as environment pollution. A mainstream terrestrial technology currently adopted for monitoring and preventing such spontaneous combustion is infrared thermal imaging for scanning, monitoring, and alarming.

Since coal mines are mostly located in remote suburban or isolated regions which can hardly be fully covered by a power grid system, existing infrared monitoring, scanning and alarming systems are powered primarily by solar panels in conjunction with an energy storage battery system. This mode is especially prevalent in cold regions like Xinjiang. However, the power supplied by the energy storage battery mode is rather instable; particularly in cold winters, suffering from reduced solar radiation combined with lower temperature, duration of an energy storage battery would be significantly shortened such that it cannot support full-day operation of the infrared thermal imaging, monitoring and alarming system; therefore, a temperature preservation and warm-up scheme is needed to enhance the battery duration. Existing battery temperature preservation apparatuses mostly lack an effective warm-up scheme, while those temperature preservation apparatuses with a warm-up feature are mostly electrically heated, which can hardly serve their roles in remote areas inaccessible to power grid; in addition, the body material of such temperature preservation apparatuses is largely made of a thermally insulative material with a low thermal conductivity but a low rigidity, which can hardly offer an effective protection to batteries in a harsh outdoor environment.

SUMMARY

To address the challenges in conventional technologies, a warm-up and temperature preservation apparatus for an energy storage battery in cold regions is described herein, which overcomes a drawback of an existing battery temperature preservation box that its warm-up feature cannot function when a power grid system is inaccessible while offering a protection to the battery in harsh environments. A technical solution of this disclosure is set forth below:

comprising a battery enclosure and a diesel-fired circulation heater, wherein the battery enclosure comprises an enclosure body and an upper cover, the enclosure body comprising an outer housing and an inner housing disposed in the outer housing; a first vacuum interlayer is set between the inner housing and the outer housing, the first vacuum interlayer being distributed along sidewalls and a bottom portion of the enclosure body; a water storage interlayer is set inside the inner housing and extends communicatively through sidewalls and a base board thereof; two water delivery pipes communicating with the water storage interlayer are disposed on top of the inner housing; the upper cover is mounted on top of the enclosure body; a silicon gasket for sealing is arranged at a joint between the upper cover and the enclosure body; a second vacuum interlayer is set inside the upper cover; water delivery holes and a routing hole are provided on the upper cover, a count of the water delivery holes corresponding to that of the water delivery pipes; a water delivery pipe adaptor is mounted at each water delivery hole, the water delivery pipe adaptor communicating with the water delivery pipe corresponding thereto; and an input end of the diesel-fired circulation heater communicates with one water delivery pipe adaptor, an output end of the diesel-fired circulation heater communicates with another water delivery pipe adaptor, and the routing hole communicates with the inner housing;

wherein a temperature sensor is provided at an inner wall of the inner housing, the temperature sensor being connected to the diesel-fired circulation heater.

In some implementations, the warm-up and temperature preservation apparatus for an energy storage battery in cold regions further comprises a cooling system, the cooling system comprising a cold water tank and a water pump, an input end of the water pump being connected to the cold water tank;

the water delivery pipe adaptors are three-way water delivery pipe adaptors, three channels of one three-way water delivery pipe adaptor being connected to the water delivery hole corresponding thereto, the input end of the diesel-fired circulation heater, and the cold water tank, respectively, and three channels of another three-way water delivery pipe adaptor being connected to the water delivery hole corresponding thereto, the output end of the diesel-fired circulation heater, and an output end of the water pump, respectively;

and the temperature sensor is connected to the water pump.

In some implementations, a first male thread is formed on an outer wall of each water delivery pipe, a first female thread is formed on an inner wall of a channel, which communicates with the water delivery pipe, of each water delivery pipe adaptor, an outer wall of each water delivery pipe is sleeved with a first silicon seal ring, each water delivery pipe adaptor is connected to the water delivery pipe corresponding thereto via fitting between the first male thread and the first female thread, the first silicon seal ring is disposed between each water delivery pipe adaptor and the top portion of the inner housing, and each water delivery pipe adaptor compresses the first silicon seal ring corresponding thereto.

In some implementations, a diameter of a lower portion of the routing hole is smaller than that of an upper portion of the routing hole; a routing bolt is disposed in the upper portion of the routing hole, a through hole being provided inside the routing bolt; a second male thread is formed on an outer wall of the routing bolt, a second female thread is formed on an inner wall of the upper portion of the routing hole, and a second silicon seal ring is provided in the upper portion of the routing hole; the routing bolt is connected to the routing hole via fitting between the second male thread and the second female thread; and the second silicon seal ring is disposed underneath the routing bolt, the routing bolt compressing the second silicon seal ring.

In some implementations, the inner housing is connected to the outer housing via an upper connection beam and a lower connection beam; a first snap block is disposed at an outer side of a top portion of each of two opposite sidewalls of the outer housing, a first snap-in recess is arranged at an inner side of a top portion of each of two opposite sidewalls of the inner housing, a second snap-in recess is arranged under one side of the lower connection beam, and a third snap-in recess is arranged above an opposite side of the lower connection beam, the first snap block being fitted in the second snap-in recess; and a second snap block and a third snap block are disposed at two ends of the upper connection beam, respectively, the second snap block being fit in the first snap-in recess, the third snap block being fit in the third snap-in recess.

In some implementations, a first slot and a second slot are provided at each of two sides of a bottom portion of the upper cover, top portions of two sidewalls of the inner housing where the upper connection beam is not disposed are inserted in the first slots, and top portions of two sidewalls of the outer housing where the upper connecting beam is not disposed are inserted in the second slots.

In some implementations, the silicon gasket is disposed at an underside of the upper cover, an inner wall of the first slot, and an inner wall of the second slot, respectively; and the silicon gasket is also provided for sealing at an interface between the upper connection beam and an inner housing, an interface between the lower connection beam and the outer housing, and an interface between the upper connection beam and the lower connection beam, respectively.

In some implementations, a thermally insulative coating is applied on an inner wall of the outer housing, an outer wall of the inner housing, and the underside of the upper cover, respectively.

In some implementations, a suction tube communicating with the first vacuum interlayer is provided on the outer housing, and a one-way valve is provided in the suction tube.

In some implementations, a water-proof coating is applied on an inner wall of the water storage interlayer of the inner housing.

This disclosure offers benefits below:
1. This disclosure adopts a structure combining a thermally insulative layer, a vacuum layer, a thermally insulative layer, and a warming-up layer arranged in sequence, which ensures a temperature preservation performance of the battery enclosure and significantly reduces heat loss of the internal environment of the battery enclosure; in addition, the diesel-fired circulation heater supplies constant-temperature hot water into the water-storage interlayer, so that the water-storage interlayer forms the warming-up layer; meanwhile, the temperature sensor guarantees that the supplied water has a constant temperature, which ensures that the environment temperature of the energy storage battery is always in the optimum operating temperature range; this prevents the temperature in the battery enclosure from becoming excessively high or excessively low, further ensures the temperature preservation performance, and thusly guarantees duration of the energy storage battery;
2. The battery enclosure described herein adopts an insertion-fitting structure, which facilitates assembly and disassembly of the apparatus, offers a simple, flexible, and highly reliable operation; in addition, this structure enables replacement of parts of different materials as per environment requirements and thusly offers a strong environment adaptability;
3. This disclosure further sets a cooling system; when the battery temperature is higher than a set upper limit temperature, the temperature sensor would detect the temperature abnormality and then starts the cooling system; the cooling system cools the battery enclosure through cold water, which prevents a fire accident due to overheat of the energy storage battery and guarantees longevity and operation safety of the battery.

Figure 1:
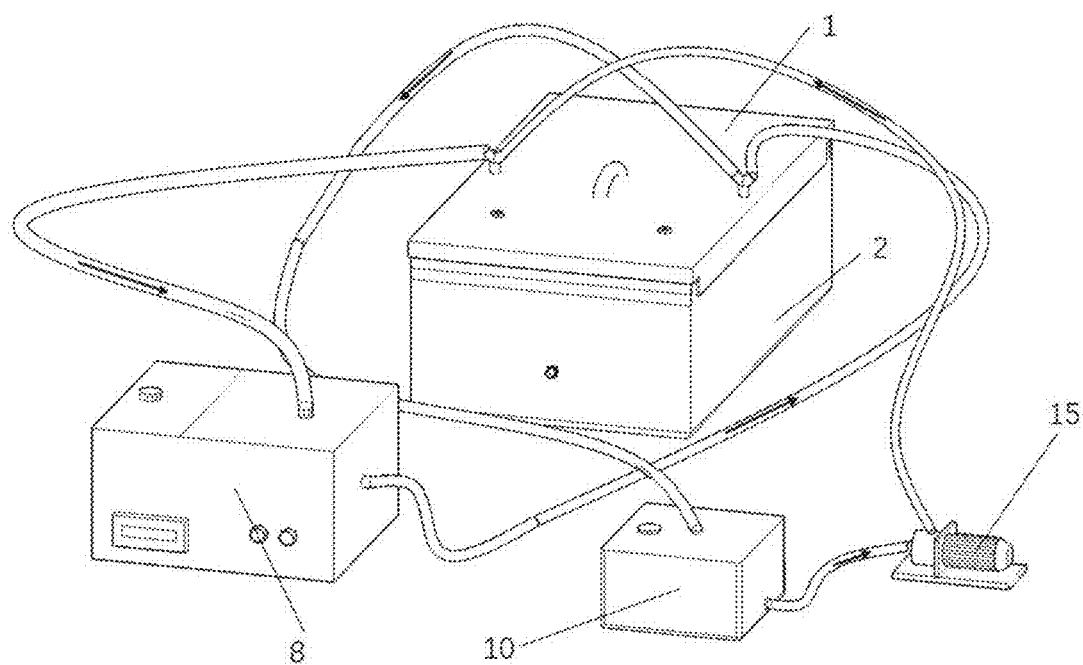
FIG. 1 is an overall structural view of this disclosure.

Reference Numerals in the Drawings: 1—upper cover; 2—outer housing; 3—inner housing; 4—upper connection beam; 5—lower connection beam; 6—three-way water delivery pipe adaptor; 7—routing bolt; 8—diesel-fired circulation heater; 9—water delivery pipe; 10—cold water tank; 11—silicon gasket; 12—first vacuum interlayer;

13—thermally insulative coating; 14—first male thread; 15—water pump; 16—first silicon seal ring; 17—second silicon seal ring; 18—water delivery hole; 19—routing hole; 20—handle; 21—second vacuum interlayer; 22—first snap block; 23—one-way valve; 24—suction tube; 25—temperature sensor; 26—first snap-in recess; 27—water storage interlayer; 28—second snap block; 29—third snap block; 30—third snap-in recess; 31—second snap-in recess; 32—first slot; 33—second slot.

DETAILED DESCRIPTION OF EMBODIMENTS

To make the present application more definite and apparent, the technical solutions of the present application will be described in further detail through example implementations with reference to the accompanying drawings; it would be appreciated that the example implementations are only illustrative embodiments, not representative of all implementations.

Terms such as "upper, lower, inner, outer" referred to herein are defined based on the positional relationships illustrated in the drawings, while corresponding positional relationships would vary in different drawings, which, therefore, shall not be understood as exclusive limitations of the scope of protection of the present application.

Figure 2:
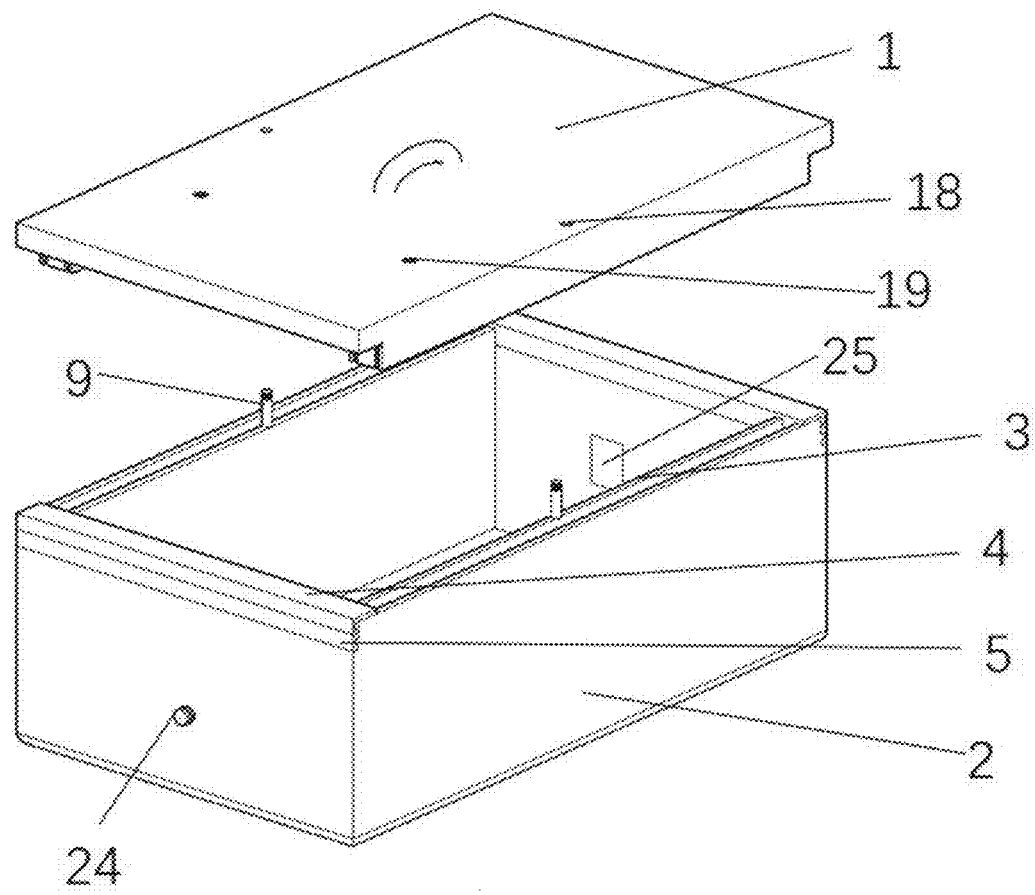
FIG. 2 is a structural schematic view of a battery enclosure when an upper cover is not connected to an enclosure body according to this disclosure.
Figure 3:
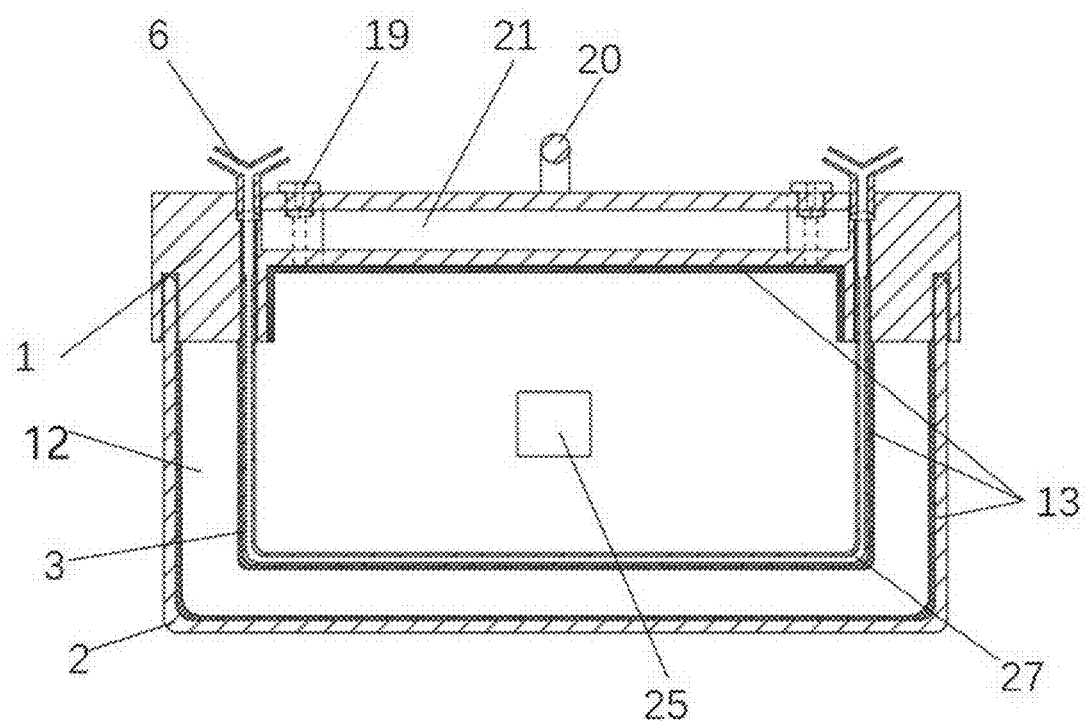
FIG. 3 is a side sectional view of the battery enclosure according to this disclosure.
Figure 4:
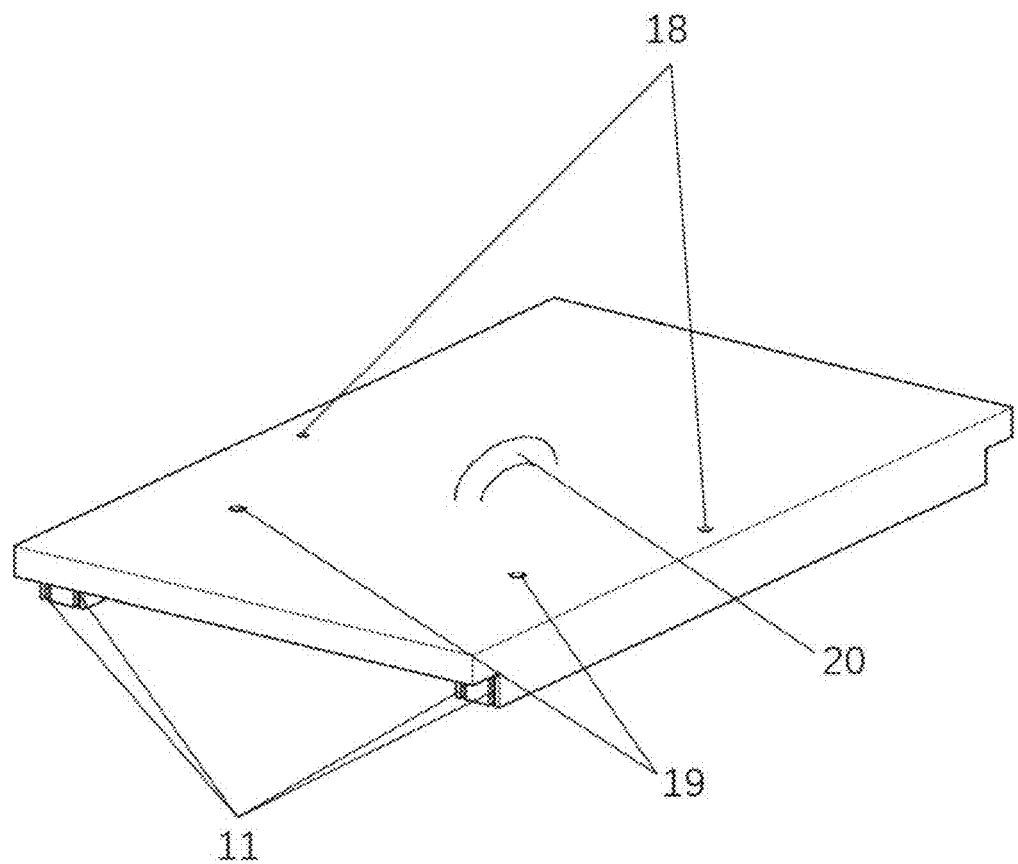
FIG. 4 is a structural schematic diagram of the upper cover according to this disclosure.
Figure 5:
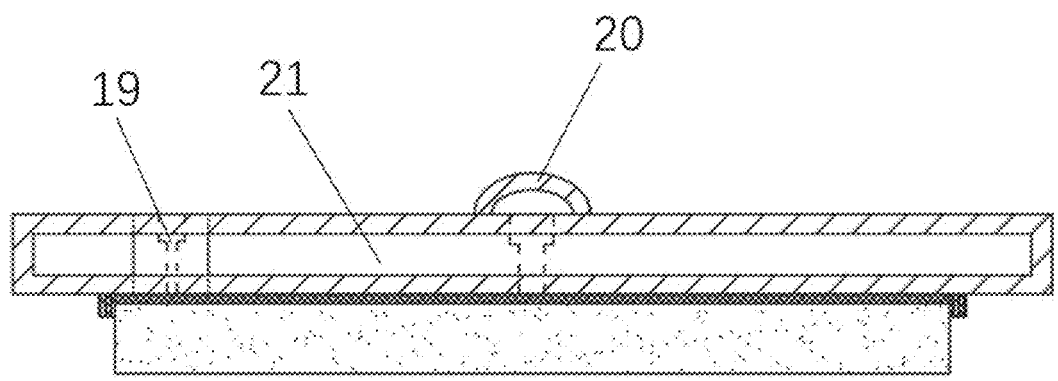
FIG. 5 is a front sectional view of the upper cover according to this disclosure.
Figure 6:
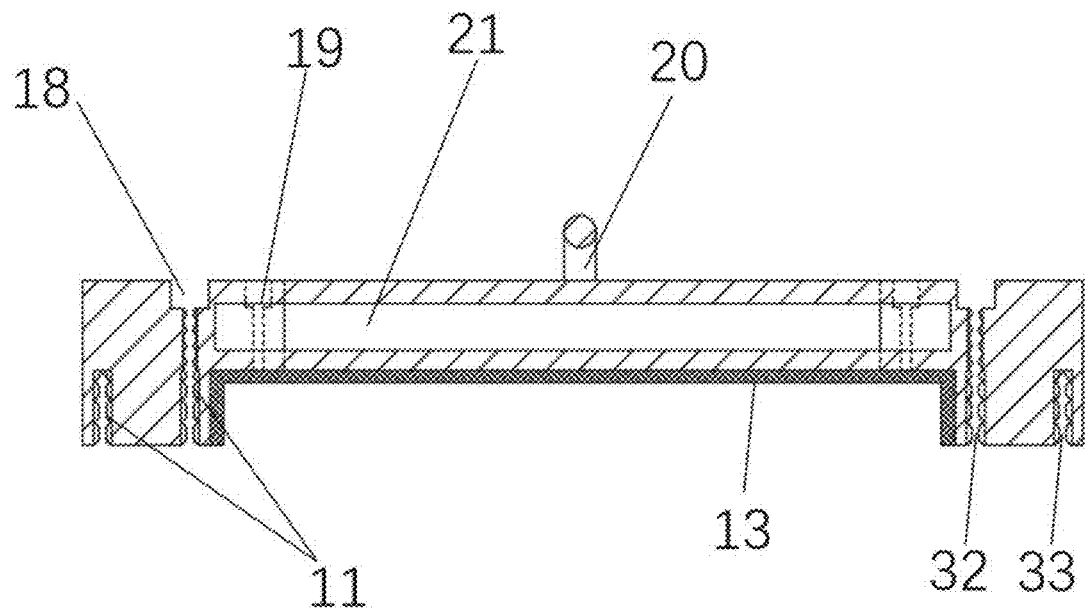
FIG. 6 is a side sectional view of the upper cover according to this disclosure.
Figure 7:
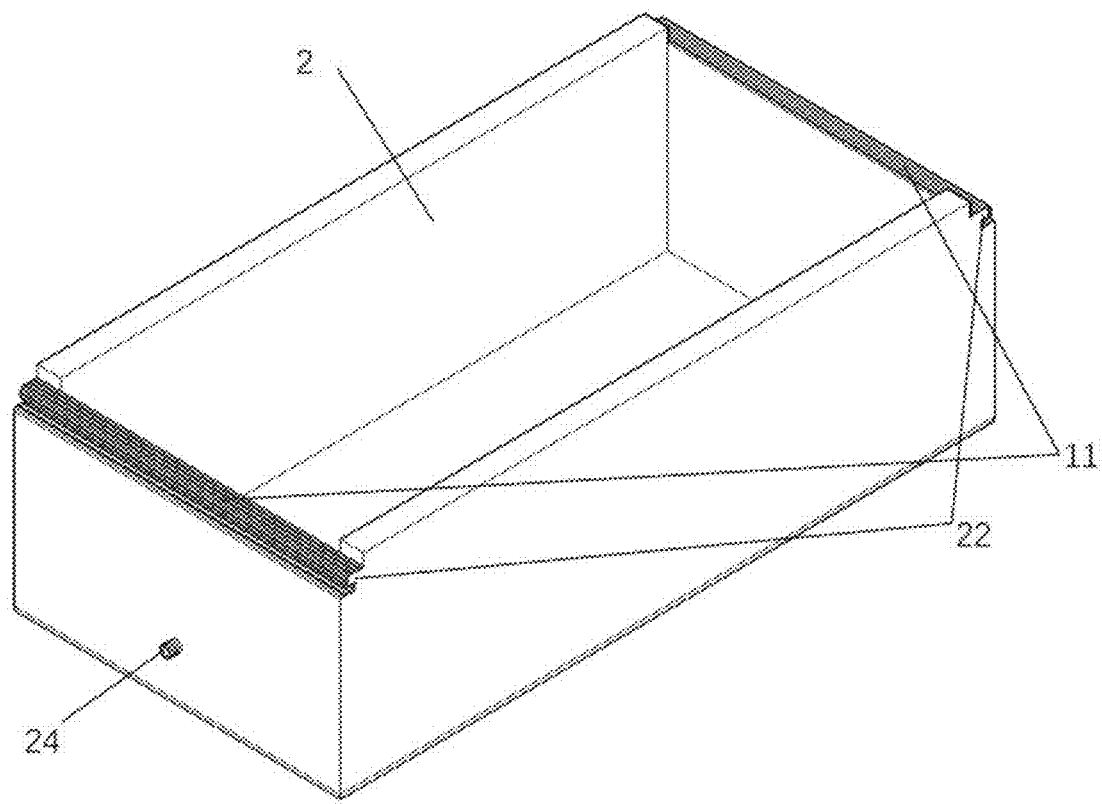
FIG. 7 is a structural schematic view of an outer housing according to this disclosure.
Figure 8:
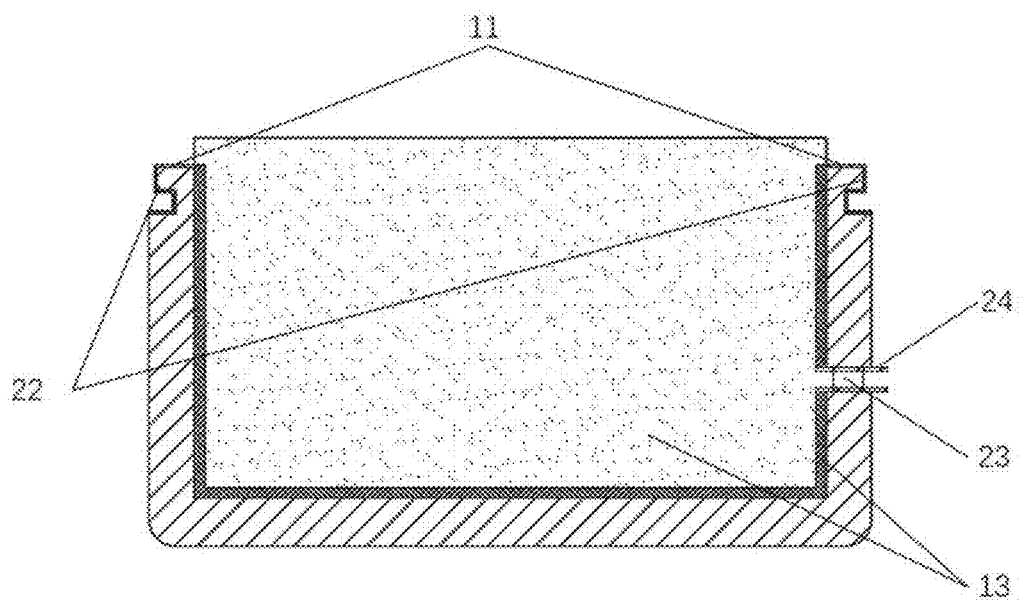
FIG. 8 is a front sectional view of the outer housing according to this disclosure.
Figure 9:
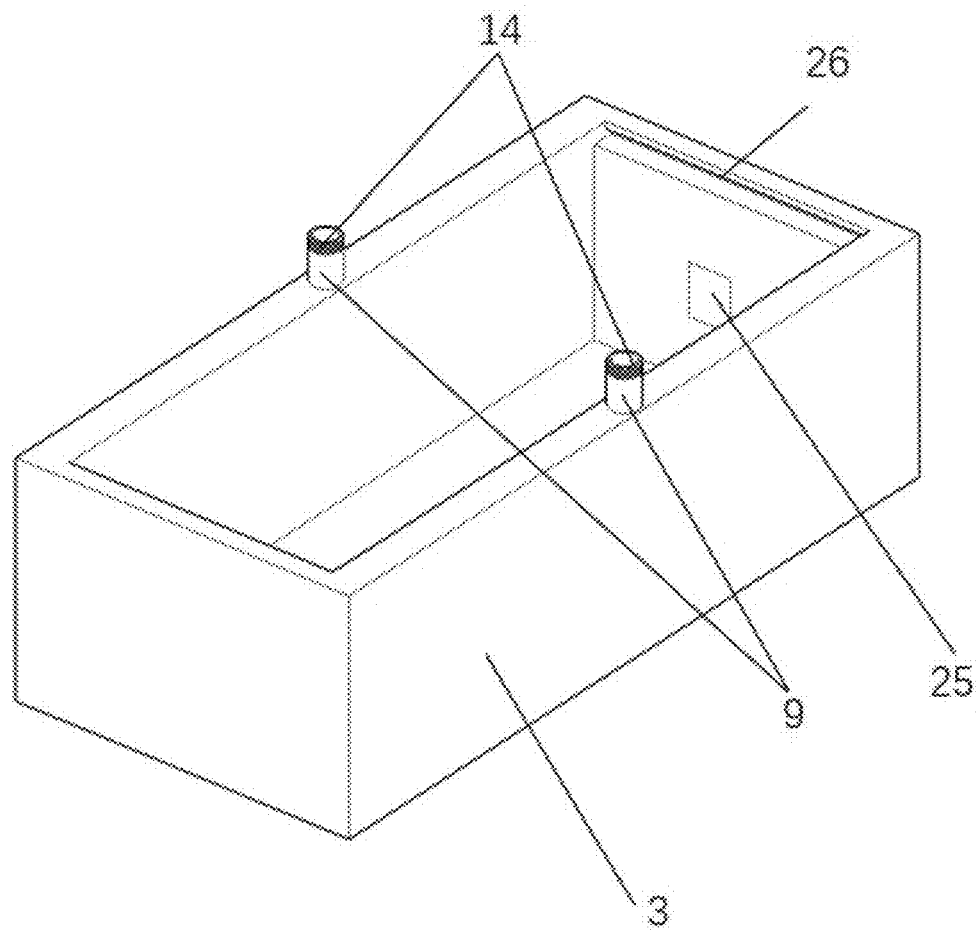
FIG. 9 is a structural schematic view of an inner housing according to this disclosure.
Figure 10:
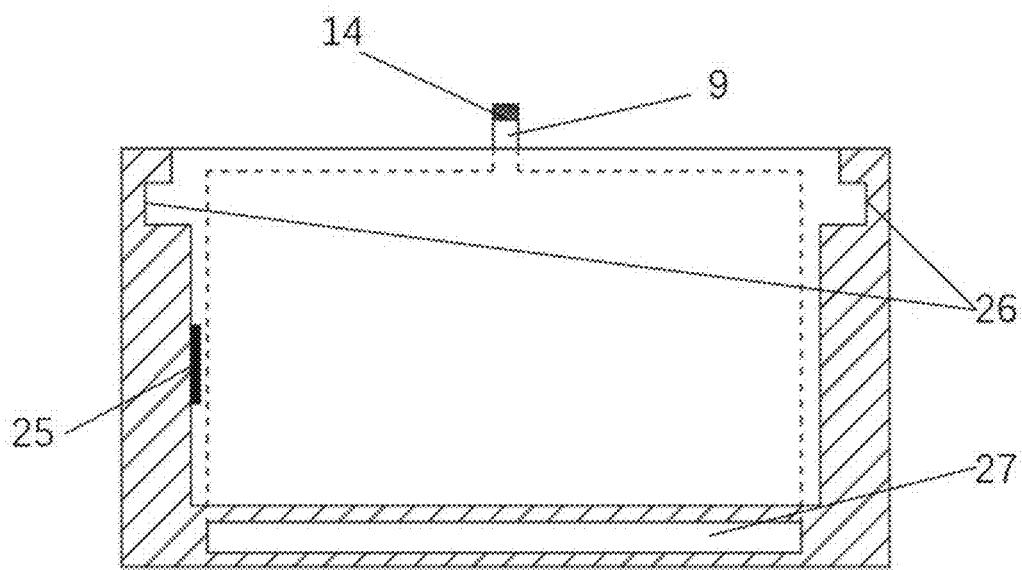
FIG. 10 is a front sectional view of the inner housing according to this disclosure.
Figure 11:
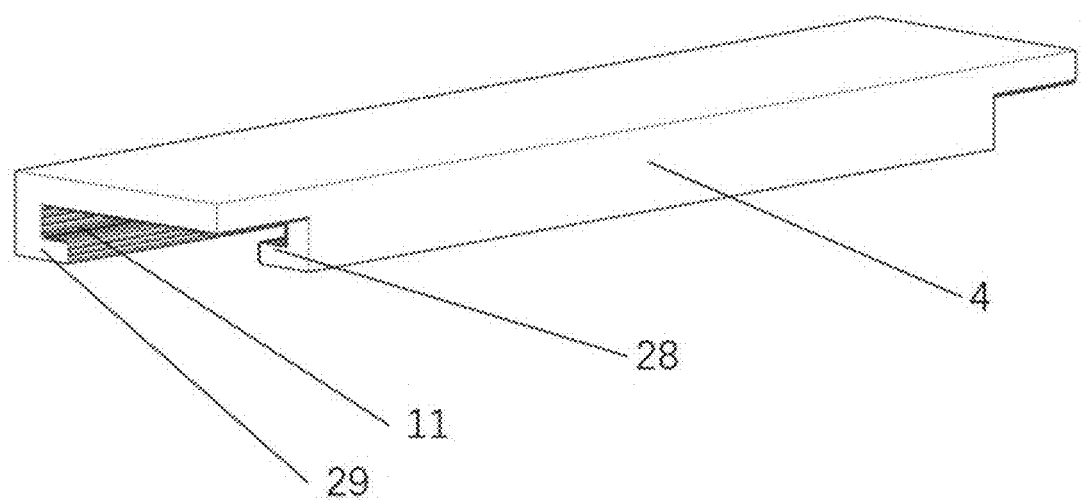
FIG. 11 is a structural schematic view of an upper connection beam according to this disclosure.
Figure 12:
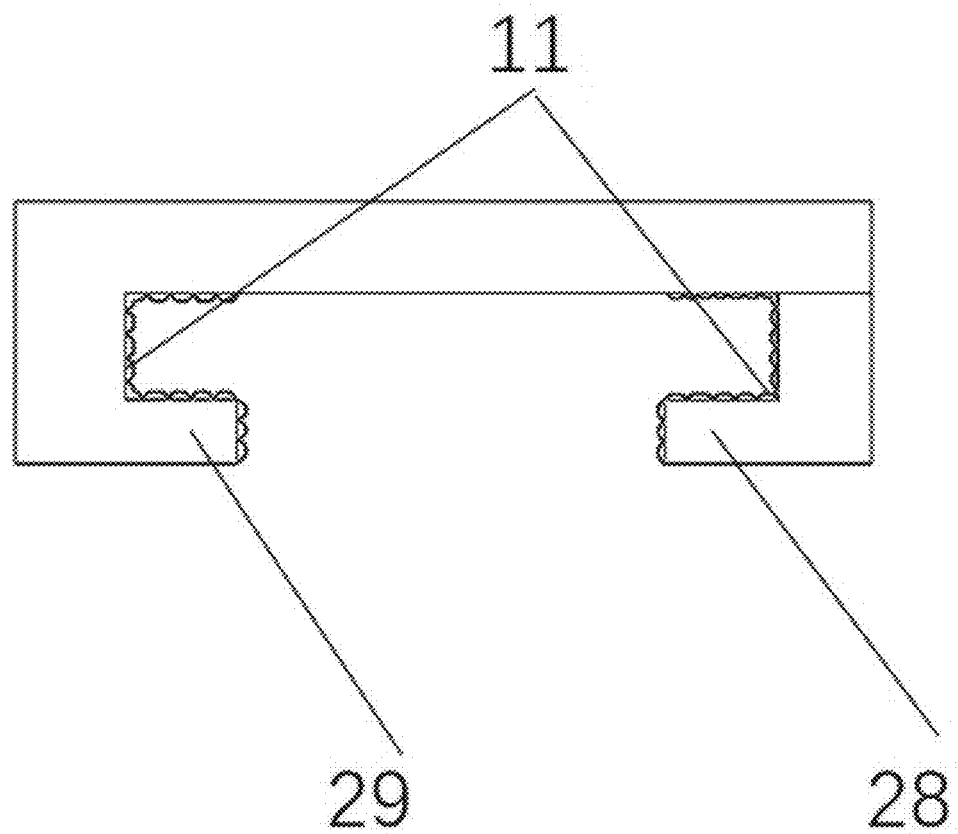
FIG. 12 is a left view of the upper connection beam according to this disclosure.
Figure 13:
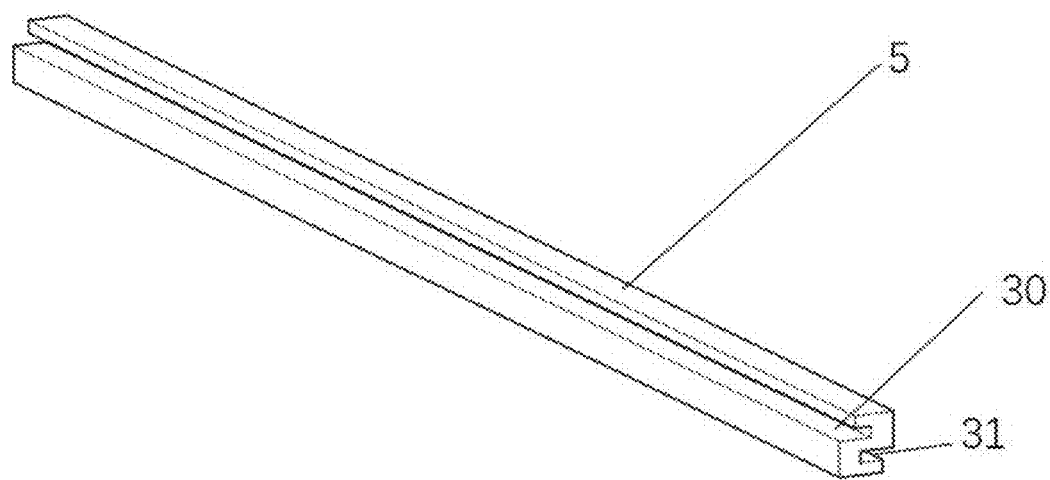
FIG. 13 is a structural schematic view of a lower connection beam according to this disclosure.
Figure 14:
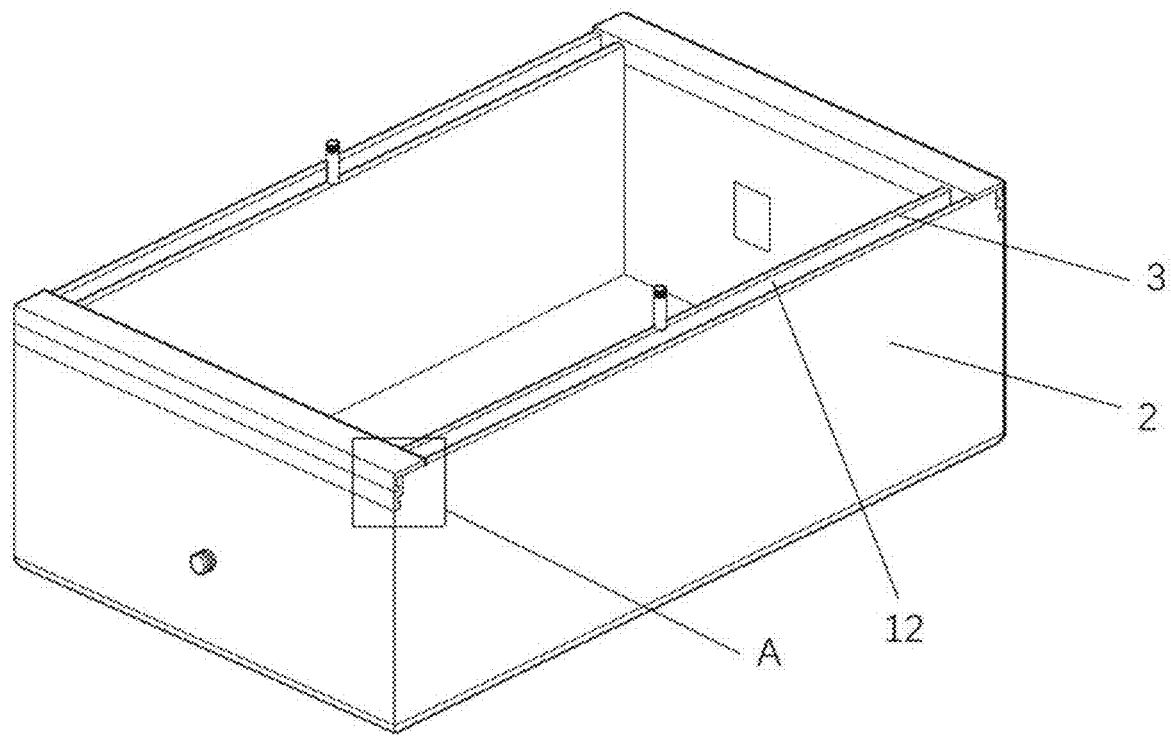
FIG. 14 is a structural schematic view of the enclosure body assembled with the upper connection beam and the lower connection beam according to this disclosure.
Figure 15:
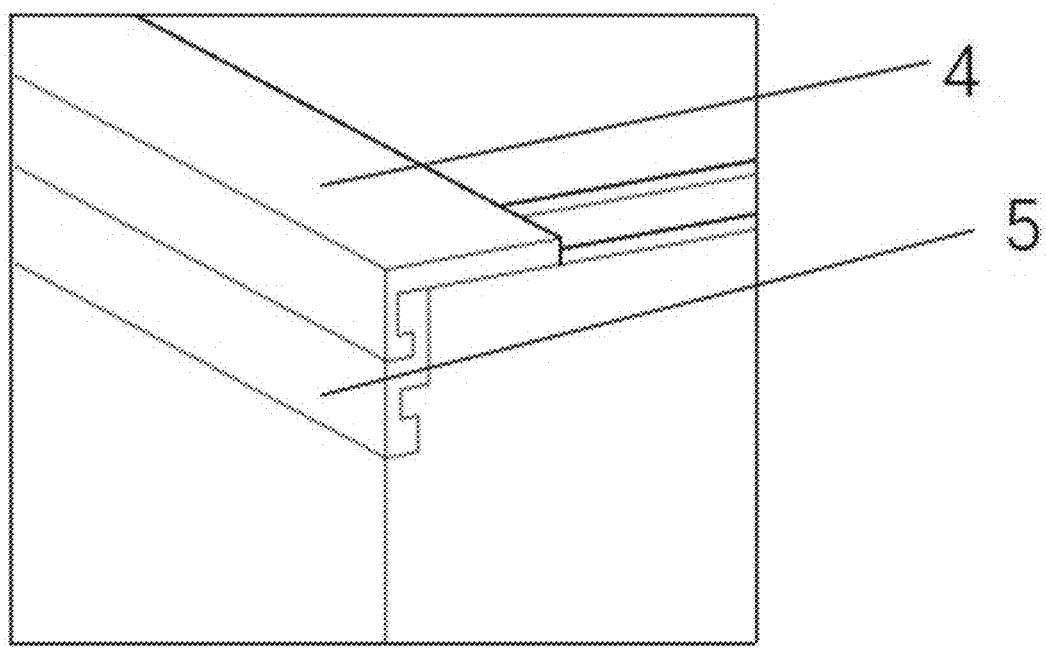
FIG. 15 is an enlarged structural view of part A in FIG. 14.
Figure 16:
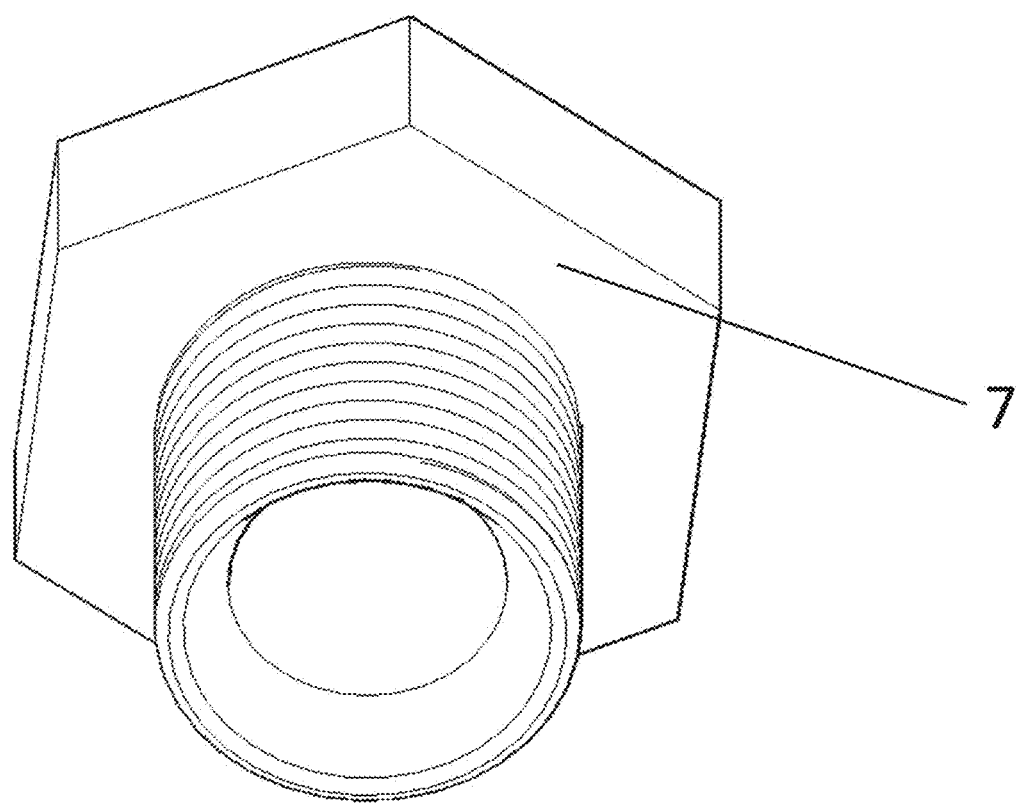
FIG. 16 is a structural schematic view of a routing bolt according to this disclosure.
Figure 17:
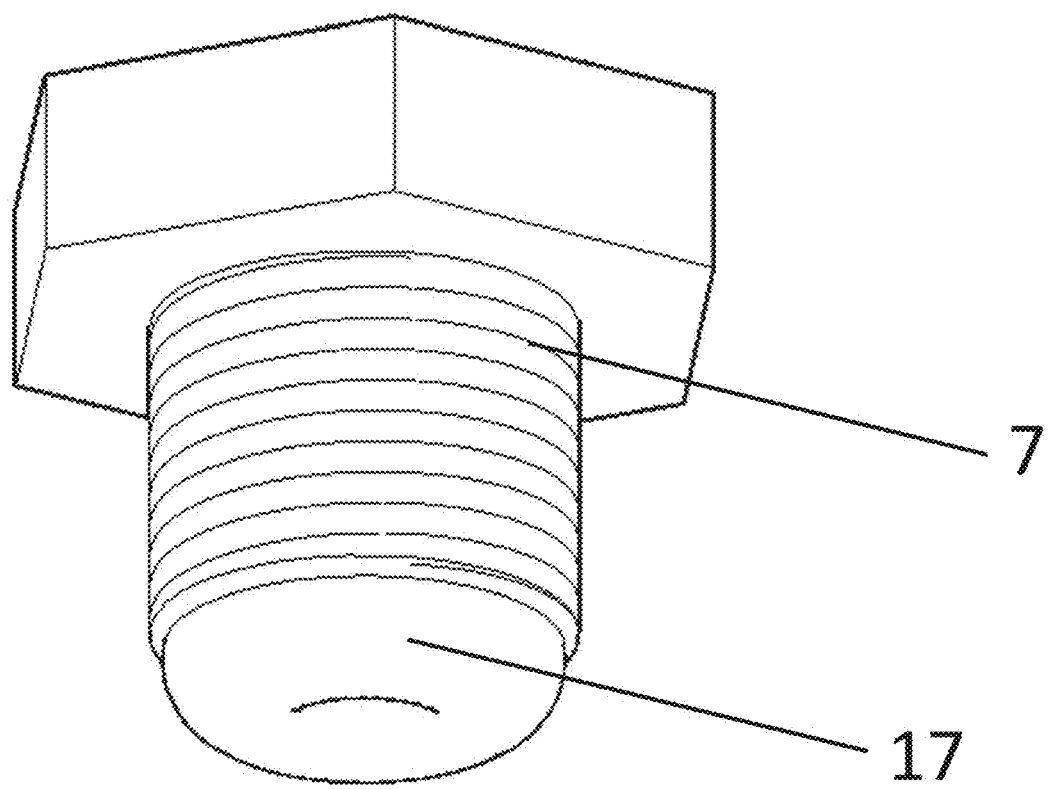
FIG. 17 is a schematic view of fitting between the routing bolt and a second silicon seal ring according to this disclosure.
Figure 18:
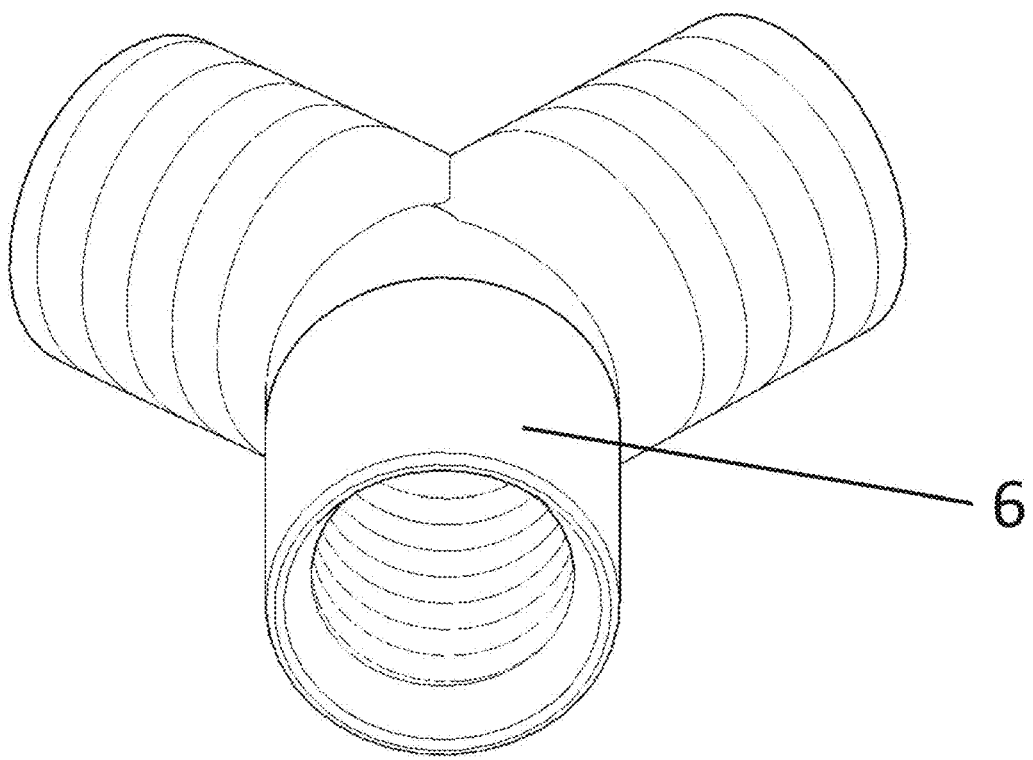
FIG. 18 is a structural schematic diagram of a three-way water delivery pipe adaptor according to this disclosure.
Figure 19:
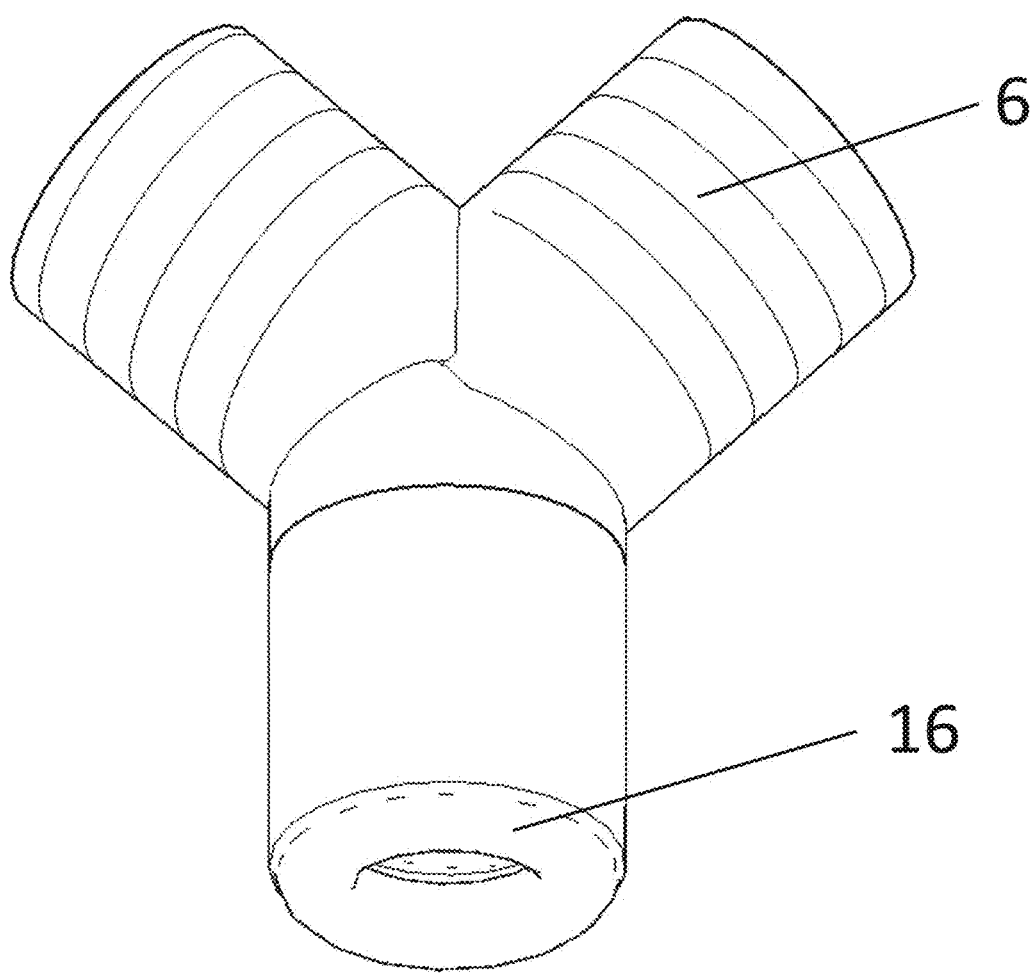
FIG. 19 is a schematic diagram of fitting between the three-way water delivery pipe adaptor and a first silicon seal ring.

Referring to FIGS. 1-19, a warm-up and temperature preservation apparatus for an energy storage battery in cold regions comprises a battery enclosure and a diesel-fired circulation heater 8, the battery enclosure comprising an enclosure body and an upper cover 1, on top of the upper cover 1 being provided a handle 20; the enclosure body comprises an outer housing 2 and an inner housing 3 disposed in the outer housing 2; a first vacuum interlayer 12 is set between the inner housing 3 and the outer housing 2, the first vacuum interlayer 12 being distributed along sidewalls and a bottom portion of the enclosure body; a water storage interlayer 27 id set inside the inner housing 3 and extends communicatively through sidewalls and a base board thereof; two water delivery pipes 9 communicating with the water storage interlayer 27 are disposed on top of the inner housing 3; the upper cover 1 is mounted on top of the enclosure body; a silicon gasket 11 for sealing is arranged at a joint between the upper cover 1 and the enclosure body; a second vacuum interlayer 21 is set inside the upper cover 1; water delivery holes 18 and a routing hole 19 are provided on the upper cover 1, a count of the water delivery holes 18 corresponding to that of the water delivery pipes 9; a water delivery pipe adaptor is mounted at each water delivery hole 18, the water delivery pipe adaptor communicating with the water delivery pipe 9 corresponding thereto; and an input end of the diesel-fired circulation heater 8 communicates with one water delivery pipe adaptor, an output end of the diesel-fired circulation heater 8 communicates with another water delivery pipe adaptor, and the routing hole 19 communicates with the inner housing 3;

the warm-up and temperature preservation apparatus for an energy storage battery in cold regions further comprises a cooling system, the cooling system comprising a cold water tank 10 and a water pump 15, an input end of the water pump 15 being connected to the cold water tank 10;

the water delivery pipe adaptors are three-way water delivery pipe adaptors 6, three channels of one three-way water delivery pipe adaptor being connected to the water delivery hole 18 corresponding thereto, the input end of the diesel-fired circulation heater 8, and the cold water tank 10, respectively, and three channels of another three-way water delivery pipe adaptor 6 being connected to the water delivery hole 18 corresponding thereto, the output end of the diesel-fired circulation heater 8, and the output end of the water pump 15, respectively;

and a temperature sensor 25 is provided on an inner wall of the inner housing 3, the temperature sensor 25 being connected to the diesel-fired circulation heater 8 and the water pump 15, respectively.

The energy storage battery is disposed in the inner housing 3, a circuit of the energy storage battery and a wire of the temperature sensor 25 extending out of the enclosure body via the routing hole 19.

Specifically, a first male thread 14 is formed on an outer wall of each water delivery pipe 9, a female thread is formed on an inner wall of a channel, which communicates with the water delivery pipe 9, of each water delivery pipe adaptor, an outer wall of each water delivery pipe 9 is sleeved with a first silicon seal ring 16, each water delivery pipe adaptor is connected to the water delivery pipe 9 corresponding thereto via fitting between the first male thread 14 and the first female thread, the first silicon seal ring 16 is disposed between each water delivery pipe adaptor and a top portion of the inner housing 3, and each water delivery pipe adaptor compresses the first silicon seal ring 16 corresponding thereto. By mounting each water delivery pipe adaptor on the water delivery pipe 9 corresponding thereto via thread-fitting, as the water delivery pipe adaptor is screwed on, the first silicon seal ring 16 is compressed to close the interstices between the water delivery pipe 9 and the water delivery hole 18 and between the water delivery pipe 9 and the water delivery pipe adaptor, ensuring sealed performance of the battery enclosure;

a diameter of a lower portion of the routing hole 19 is smaller than that of an upper portion thereof; a routing bolt 7 is arranged in the upper portion of the routing hole 19, and a through hole is provided inside the routing bolt 7; a second male thread is formed on an outer wall of the routing hole 7, and a second inner thread is arranged on an inner wall of the upper portion of the routing hole 19; a second silicon seal ring 17 is disposed in the upper portion of the routing hole 19; the routing bolt 7 is connected to the routing hole 19 via fitting between the second male thread and the second female thread; the second silicon seal ring 17 is disposed underneath the routing bolt 7, and the routing bolt 7 compresses the second silicon seal ring 17. The circuit extends out through the routing hole 19 and the through hole in the routing bolt 7. The routing bolt 7 is screwed into the routing hole 19. As the routing bolt 7 is screwed on, the second silicon seal ring 17 is compressed to seal the interstices between the wire and the routing hole 19 and between the wire and the routing bolt 7, ensuring the sealed performance of the battery enclosure while satisfying routing requirements.

Specifically, the inner housing 3 is connected to the outer housing 2 via an upper connection beam 4 and a lower connection beam 5. A first snap block 22 is provided at an outer side of a top portion of each of two opposite sidewalls of the outer housing 2. A first snap-in recess 26 is arranged at an inner side of a top portion of each of two opposite sidewalls of the inner housing 3. A second snap-in recess 31 is arranged under one side of the lower connection beam 5. A third snap-in recess 30 is arranged above an opposite side of the lower connection beam 5. The first snap block 22 is fitted in the second snap-in recess 31. A second snap block 28 and a third snap block 29 are provided at two ends of the upper connection beam 4, respectively, the second snap block 28 being fitted in the first snap-in recess 26, the third snap block 29 being fitted in the third snap-in recess 30. The upper connection beam 4 and the lower connection beam 5 are made of stainless steel; the stainless steel, owing to its low thermal conductivity, can reduce thermal conduction between the inner and outer sides and thusly offers a better thermal insulation performance. More specifically, upon assembly, the second snap block 28 of the upper connection beam 4 is first fitted in the first snap-in recess 26 of the inner housing 3. Since the third snap block 29 of the upper connection beam 4 is disposed at the outer side of the outer housing 2, a space for mounting the lower connection beam 5 is defined between the upper connection beam 4 and the sidewall of the outer housing 2 where the first snap block 22 is disposed. To insert the lower connection beam 5 from the mounting space, the first snap block 22 of the outer housing 2 is fit in the second snap-in recess 31 of the lower connection beam 5, the third snap block 29 of the upper connection beam 4 is fit in the third snap-in recess 30, and once the lower connection beam 5 is fully inserted in the mounting space, connection between the inner housing 3 and the outer housing 2 is completed.

A first slot 32 and a second slot 33 are arranged at each of two sides of a bottom portion of the upper cover 1. Top portions of two sidewalls of the inner housing 3 where the upper connection beam 4 is not disposed are inserted in the first slots 32, and top portions of two sidewalls of the outer housing 2 where the upper connection beam 4 is not disposed are inserted in the second slots 33. The insertion-fitting structure applied to connect the enclosure body to the upper connection beam 4, the lower connection beam 5, and the upper cover 1 facilitates disassembly and assembly, thereby facilitating access to the energy storage battery and facilitating replacement and maintenance of the components of the battery enclosure.

Specifically, the silicon gasket 11 is disposed at the underside of the upper cover 1, an inner wall of the first slot 32, and an inner wall of the second slot 33, respectively, and the silicon gasket 11 is also provided for sealing at an interface between the upper connection beam 4 and the inner housing 3, an interface between the lower connection beam 5 and the outer housing 2, and an interface between the upper connection beam 4 and the lower connection beam 5, respectively. The silicon gaskets 11 may seal the interstices between the upper cover 1 and the enclosure body, between the upper connection beam 4 and the enclosure body, between the lower connection beam 5 and the enclosure body, and between the upper connection beam 4 and the lower connection beam 5 to ensure the sealing performance at the joints between those components, thereby ensuring the thermal insulation performance of the battery enclosure.

Specifically, a thermally insulative coating 13 is applied on the inner wall of the outer housing 2, the outer wall of the inner housing 3, and the underside of the upper cover 1, respectively. The thermally insulative coating 13 may enhance the thermal insulation performance. The thermally insulative coating 13 may adopt a sepiolite composite silicate thermally insulative coating 13.

Specifically, a suction tube 24 communicating with the first vacuum interlayer 12 is arranged on the outer housing 2. A one-way valve 23 is provided in the suction tube 24, the one-way valve 23 being operable to exhaust air to the outside of the outer housing 2 from the first vacuum interlayer 12. Since the first vacuum interlayer 12 communicates with the ambient air before assembling the upper cover 1 to the enclosure body, the first vacuum interlayer 12 is not in a vacuum state after the upper cover 1 is connected to the enclosure body. The suction tube 24 may be connected to a vacuum suction device which suctions air out of the first vacuum interlayer 12, disposing the first vacuum interlayer 12 in the vacuum state.

Specifically, a water-proof coating is applied on an inner wall of the water storage interlayer 27 of the inner housing 3, which may prevent the water storage interlayer 27 of the inner housing 3 from being corroded and rusted, thereby enhancing durability of the inner housing 3.

A temperature interval set for a control module of the diesel-fired circulation heater 8 is between 20° C. and 28° C., where 20° C. is a trigger value for the diesel-fired circulation heater 8 to execute a control program. The temperature sensor 25, which is connected to a control module of the diesel-fired circulation heater 8 via a wire, provides a real-time temperature signal to the control module of the diesel-fired circulation heater 8. When the control module of the diesel-fired circulation heater 8 receives a signal that the temperature is lower than the trigger value 20° C., the diesel-fired circulation heater 8 is activated to inject hot water into the water storage interlayer 27 of the inner housing 3 to thereby warm up the enclosure body. The hot water injected is constantly at 30° C. When the control module of the diesel-fired circulation heater 8 receives a signal that the temperature in the inner housing 3 is higher than 28° C., the diesel-fired circulation heater 8 is inactivated to save diesel consumption;

A start/stop temperature interval set for a control module of the water pump 15 is between 40° C. and 55° C. The control module of the water pump 15 is also connected to the temperature sensor 25. When the control module of the water pump 15 receives a signal that the temperature reaches 55° C., the water pump 15 is activated to feed cold water from the cold water tank 10 into the water storage interlayer 27 where the cold water is circulated to dissipate battery heat. When the control module of the water pump 15 receives a signal that the temperature drops to 40° C., the water pump 15 is inactivated. The water in the cold water tank 10 is antifreeze-doped cold water.

An operating flow of the warm-up and temperature preservation apparatus disclosed herein is described below: the temperature sensor 25 in the inner housing 3 monitors temperature of the internal environment where the battery is located and transmits a temperature signal to the control module of the diesel-fired circulation heater 8 and the control module of the water pump 5, respectively; when the temperature sensor 25 detects that the internal temperature is lower than the preset 20° C., the control module of the diesel-fired circulation heater 8 controls the diesel-fired circulation heater to start to feed 30° C. warm water into the water storage interlayer 27 via one water delivery pipe 9; when the water in the water storage interlayer 27 is full, the water flows out via another water delivery pipe 9 and then enters the diesel-fired circulation heater 8 to circulate, whereby a constant water temperature in the water storage interlayer 27 is ensured; when the temperature of the battery environment reaches 28° C., the control module of the diesel-fired circulation heater 8 receives the signal from the temperature sensor 25 and controls the diesel-fired circulation heater 8 to stop, whereby a warm-up and thermal preservation operation is completed;

in a case that the heat produced from the operating battery is greater than the heat dissipated by the enclosure body, the battery temperature would rise abnormally high; when the temperature in the enclosure body reaches 55° C., the control module of the water pump 15 controls the water pump 15 to start to pump the cold water from the cold water tank 10 into the water storage interlayer 27 via the water delivery pipe 9 to dissipate battery heat, causing the temperature of the battery environment to drop; when the temperature inside the enclosure body drops till 40° C., the control module of the water pump 15 controls the water pump 15 to stop, whereby a cooling operation is completed;

cooperation between the cooling system, the diesel-fired circulation heater 8, and the temperature sensor 25 guarantees that the temperature of the battery environment always fluctuates within its optimal operating temperature range, thereby ensuring an optimal operating performance of the battery.

It would be appreciated that, the temperature interval and the temperature of the water injected into the water storage interlayer 27 are set dependent on actual environmental conditions, not limited to the numerical values set forth above.

The upper cover 1, the outer housing 2, and the inner housing 3 may be made of carbon steel; owing to its high strength, the carbon steel may offer effective protection to the energy storage battery in a harsh outdoor environment. In a high-temperature environment such as the summer, the carton steel inner housing 3 may be replaced by a PCM (phase-change material) inner housing 3; in the high-temperature operating condition, the thermally insulative coatings and the vacuum interlayers may resist heat penetration from the ambient high-temperature environment; in addition, the PCM inner housing 3 can promptly absorb the heat produced from the operating energy storage battery; the PCM inner housing 3 combined with the thermally insulative coatings and the vacuum interlayers can effectively inhibit temperature rise of the energy storage battery, ensuring that the battery operates within the optimum operating temperature range to give a full play.

What have been illustrated and described supra are some implementations of this disclosure. A person of normal skill in the art may alter, modify, substitute, and transform these example implementations without departing from the principle and spirits of this disclosure, and a scope of this disclosure is defined by the appended claims and their equivalents.

What is claimed is:

1. A warm-up and temperature preservation apparatus for an energy storage battery in cold regions, comprising: a battery enclosure and a diesel-fired circulation heater, wherein the battery enclosure comprises an enclosure body and an upper cover, the enclosure body comprising an outer housing and an inner housing disposed in the outer housing; a first vacuum interlayer is set between the inner housing and the outer housing, the first vacuum interlayer being distributed along sidewalls and a bottom portion of the enclosure body; a water storage interlayer is set inside the inner housing and extends communicatively through sidewalls and a base board thereof; two water delivery pipes communicating with the water storage interlayer are disposed on top of the inner housing; the upper cover is mounted on top of the enclosure body; a silicon gasket for sealing is arranged at a joint between the upper cover and the enclosure body; a second vacuum interlayer is set inside the upper cover; water delivery holes and a routing hole are provided on the upper cover, a count of the water delivery holes corresponding to that of the water delivery pipes; a water delivery pipe adaptor is mounted at each water delivery hole, the water delivery pipe adaptor communicating with the water delivery pipe corresponding thereto; and an input end of the diesel-fired circulation heater communicates with one water delivery pipe adaptor, an output end of the diesel-fired circulation heater communicates with another water delivery pipe adaptor, and the routing hole communicates with the inner housing;

wherein a temperature sensor is provided at an inner wall of the inner housing, the temperature sensor being connected to the diesel-fired circulation heater;

and wherein the inner housing is connected to the outer housing via an upper connection beam and a lower connection beam; a first snap block is disposed at an outer side of a top portion of each of two opposite sidewalls of the outer housing, a first snap-in recess is arranged at an inner side of a top portion of each of two opposite sidewalls of the inner housing, a second snap-in recess is arranged under one side of the lower connection beam, and a third snap-in recess is arranged above an opposite side of the lower connection beam, the first snap block being fitted in the second snap-in recess; and a second snap block and a third snap block are disposed at two ends of the upper connection beam, respectively, the second snap block being fit in the first snap-in recess, the third snap block being fit in the third snap-in recess.

2. The warm-up and temperature preservation apparatus for an energy storage battery in cold regions according to claim 1, further comprising a cooling system, the cooling system comprising a cold water tank and a water pump, an input end of the water pump being connected to the cold water tank;

the water delivery pipe adaptors are three-way water delivery pipe adaptors, three channels of one three-way water delivery pipe adaptor being connected to the water delivery hole corresponding thereto, the input end of the diesel-fired circulation heater, and the cold water tank, respectively, and three channels of another three-way water delivery pipe adaptor being connected to the water delivery hole corresponding thereto, the output end of the diesel-fired circulation heater, and an output end of the water pump, respectively;

and the temperature sensor is connected to the water pump.

3. The warm-up and temperature preservation apparatus for an energy storage battery in cold regions according to claim 1, wherein a first male thread is formed on an outer wall of each water delivery pipe, a first female thread is formed on an inner wall of a channel, which communicates with the water delivery pipe, of each water delivery pipe adaptor, an outer wall of each water delivery pipe is sleeved with a first silicon seal ring, each water delivery pipe adaptor is connected to the water delivery pipe corresponding thereto via fitting between the first male thread and the first female thread, the first silicon seal ring is disposed between each water delivery pipe adaptor and the top portion of the inner housing, and each water delivery pipe adaptor compresses the first silicon seal ring corresponding thereto.

4. The warm-up and temperature preservation apparatus for an energy storage battery in cold regions according to claim 2, wherein a first male thread is formed on an outer wall of each water delivery pipe, a first female thread is formed on an inner wall of a channel, which communicates with the water delivery pipe, of each water delivery pipe adaptor, an outer wall of each water delivery pipe is sleeved with a first silicon seal ring, each water delivery pipe adaptor is connected to the water delivery pipe corresponding thereto via fitting between the first male thread and the first female thread, the first silicon seal ring is disposed between each water delivery pipe adaptor and the top portion of the inner housing, and each water delivery pipe adaptor compresses the first silicon seal ring corresponding thereto.

5. The warm-up and temperature preservation apparatus for an energy storage battery in cold regions according to claim 1, wherein a diameter of a lower portion of the routing hole is smaller than that of an upper portion of the routing hole; a routing bolt is disposed in the upper portion of the routing hole, a through hole being provided inside the routing bolt; a second male thread is formed on an outer wall of the routing bolt, a second female thread is formed on an inner wall of the upper portion of the routing hole, and a second silicon seal ring is provided in the upper portion of the routing hole; the routing bolt is connected to the routing hole via fitting between the second male thread and the second female thread; and the second silicon seal ring is disposed underneath the routing bolt, the routing bolt compressing the second silicon seal ring.

6. The warm-up and temperature preservation apparatus for an energy storage battery in cold regions according to claim 1, wherein a first slot and a second slot are provided at each of two sides of a bottom portion of the upper cover, top portions of two sidewalls of the inner housing where the upper connection beam is not disposed are inserted in the first slots, and top portions of two sidewalls of the outer housing where the upper connecting beam is not disposed are inserted in the second slots.

7. The warm-up and temperature preservation apparatus for an energy storage battery in cold regions according to claim 6, wherein the silicon gasket is disposed at an underside of the upper cover, an inner wall of the first slot, and an inner wall of the second slot, respectively; and the silicon gasket is also provided for sealing at an interface between the upper connection beam and an inner housing, an interface between the lower connection beam and the outer housing, and an interface between the upper connection beam and the lower connection beam, respectively.

8. The warm-up and temperature preservation apparatus for an energy storage battery in cold regions according to claim 1, wherein a thermally insulative coating is applied on an inner wall of the outer housing, an outer wall of the inner housing, and the underside of the upper cover, respectively.

9. The warm-up and temperature preservation apparatus for an energy storage battery in cold regions according to claim 1, wherein a suction tube communicating with the first vacuum interlayer is provided on the outer housing, and a one-way valve is provided in the suction tube.

10. The warm-up and temperature preservation apparatus for an energy storage battery in cold regions according to claim 1, wherein a water-proof coating is applied on an inner wall of the water storage interlayer of the inner housing.

* * * * *